(12) United States Patent
Sakamaki et al.

(10) Patent No.: US 7,497,444 B2
(45) Date of Patent: Mar. 3, 2009

(54) CHUCK DEVICE

(75) Inventors: Kazuo Sakamaki, Ojiya (JP); Akira Sakamaki, Ojiya (JP); Tadashi Taniguchi, Ojiya (JP)

(73) Assignee: Yukiwa Seiko Kabushiki Kaisha, Niigata (JP)

( * ) Notice: Subject to any disclaimer, the term of this patent is extended or adjusted under 35 U.S.C. 154(b) by 346 days.

(21) Appl. No.: 11/105,506

(22) Filed: Apr. 14, 2005

(65) Prior Publication Data

US 2005/0230926 A1 Oct. 20, 2005

(30) Foreign Application Priority Data

Apr. 20, 2004 (JP) ............... 2004-123777

(51) Int. Cl.
*B23B 31/16* (2006.01)
(52) U.S. Cl. .................. 279/62; 279/140; 279/902
(58) Field of Classification Search ............. 279/60, 279/61, 62, 140, 902
See application file for complete search history.

(56) References Cited

U.S. PATENT DOCUMENTS

| 5,031,925 | A * | 7/1991 | Tatsu et al. | 279/64 |
|---|---|---|---|---|
| 5,232,230 | A * | 8/1993 | Lin | 279/62 |
| 5,957,469 | A * | 9/1999 | Miles et al. | 279/62 |
| 6,095,530 | A * | 8/2000 | Rohm | 279/62 |
| 6,129,363 | A * | 10/2000 | Mack | 279/62 |
| 6,659,474 | B2 * | 12/2003 | Sakamaki et al. | 279/62 |
| 6,824,141 | B1 * | 11/2004 | Sakamaki et al. | 279/62 |
| 6,843,485 | B2 * | 1/2005 | Sakamaki et al. | 279/62 |
| 6,902,171 | B2 * | 6/2005 | Sakamaki et al. | 279/62 |
| 7,125,021 | B2 * | 10/2006 | Tan | 279/62 |
| 7,249,770 | B2 * | 7/2007 | Yang et al. | 279/62 |
| 7,296,803 | B2 * | 11/2007 | Yang et al. | 279/62 |
| 7,360,770 | B2 * | 4/2008 | Luckenbaugh et al. | 279/62 |
| 7,431,308 | B2 * | 10/2008 | Cachod | 279/62 |
| 2003/0042692 | A1 * | 3/2003 | Sakamaki et al. | 279/62 |
| 2005/0087937 | A1 * | 4/2005 | Zhou | 279/62 |
| 2006/0038359 | A1 * | 2/2006 | Luckenbaugh et al. | 279/62 |
| 2006/0279048 | A1 * | 12/2006 | Gong et al. | 279/62 |
| 2007/0052182 | A1 * | 3/2007 | Bordeianu | 279/62 |
| 2007/0241519 | A1 * | 10/2007 | Zhou et al. | 279/62 |

FOREIGN PATENT DOCUMENTS

| JP | 2003-071618 | 3/2003 |
|---|---|---|
| JP | 2003-225813 | 8/2003 |

* cited by examiner

*Primary Examiner*—David P Bryant
*Assistant Examiner*—Eric A Gates
(74) *Attorney, Agent, or Firm*—Sughrue Mion, PLLC

(57) ABSTRACT

A chuck device that prevents wear of ratchet teeth is provided. The chuck device includes a rotary sleeve which is rotated so that jaws inserted into a hole provided in a tip end of a body are slidingly opened and closed to thereby clamp a tool. Ratchet teeth forming an annular shape are provided in the body, an annular rotary member threadedly engaged with the jaws and rotated together with the rotary sleeve is fitted around the body inside of the rotary sleeve, a retainer spring member detachably engaging with the ratchet teeth is disposed outside of the ratchet teeth and the retainer spring member is provided so as to rotate a circumference of the ratchet teeth in accordance with the rotation of the rotary member. The ratchet teeth are formed of a harder member than the body, and the harder member is a discrete member from the body.

18 Claims, 9 Drawing Sheets

CHUCK DEVICE

FIELD OF THE INVENTION

The present invention relates to a chuck device for clamping a tool.

BACKGROUND OF THE INVENTION

A chuck device having a looseness preventing mechanism is proposed as a chuck device having a structure described in Japanese Patent Application No. 2001-260708 (patent publication 1) assigned to the present assignee. Incidentally, since the structure thereof is the same as that of a first embodiment of the invention, the structure will be described with reference to FIGS. 1 to 4.

In such a chuck device having a looseness preventing mechanism, a rotary sleeve 1 is rotated so that a plurality of jaws 3 inserted into a hole 2a formed at a tip end of a body 2 is slidingly opened and closed; a tool 4 is clamped by the jaws 3; ratchet teeth 5 forming an annular shape are provided on the body 2; an annular rotary member 17 engaged with the jaws 3 and rotated together with the rotary sleeve 1 is fitted around the body 2 inside of the rotary sleeve 1; a retainer spring member 7 that is detachably engaged with the ratchet teeth 5 is arranged outside of the ratchet teeth 5; the retainer spring member 7 is provided so as to rotate around the ratchet teeth 5 together with the rotation of the rotary member 17; the retainer spring member 7 is mounted on the rotary member 17 by a convex and concave engagement means; and a holder portion for holding the condition that the engagement between the ratchet teeth 5 and the retainer spring member 7 is held and the disengagement between the ratchet teeth 5 and the retainer spring member 7 is held is provided.

By the way, in such a chuck device, it is proposed to manufacture the above-described body of light alloy such as aluminum in order to meet the requirement of weight reduction. However, since the ratchet teeth are formed by machining the ratchet teeth directly to the body, if the body is made of light alloy such as aluminum, then the ratchet teeth themselves are made of light alloy.

However, since the ratchet teeth are continuously and repetitively engaged with the retainer spring member made of steel, if the ratchet teeth are made of light alloy such as aluminum that is softer than the steel, the ratchet teeth are easily worn due to the continuous and repetitive engagement so that the looseness preventing mechanism does not work. This is disadvantageous in durability and maintenance.

Although a publication of Japanese Patent Application No. 2002-024495 (patent publication 2) assigned to the present assignee discloses a point for applying a coating on surfaces of the body and the ratchet teeth to thereby prevent the wear of the above-described ratchet, it is currently demanded to enhance the durability of the ratchet teeth more.

Patent Publication: Japanese Patent Application No. 2001-260708

Patent Publication: Japanese Patent Application No. 2002-024495

SUMMARY OF THE INVENTION

Accordingly, in order to overcome the above-noted defects, an object of the present invention is to provide a chuck device that prevents wear of ratchet teeth with a simple structure to make it possible to enhance durability and maintenance and that is extremely excellent in practical use.

The essence of the invention will now be described with reference to the accompanying drawings.

According to a first aspect of the invention, there is provided a chuck device in which a rotary sleeve 1 is rotated so that a plurality of jaws 3 inserted into a hole 2a provided in a tip end of a body 2 is slidingly opened and closed to thereby clamp a tool 4 by the jaws 3, characterized in that ratchet teeth 5 forming an annular shape are provided in the body 2, an annular rotary member 17 threadedly engaged with the jaws 3 and rotated together with the rotary sleeve 1 is fitted around the body 2 inside of the rotary sleeve 1, a retainer spring member 7 detachably engaging with the ratchet teeth 5 is disposed outside of the ratchet teeth 5, the retainer spring member 7 is provided so as to rotate a circumference of the ratchet teeth 5 in accordance with the rotation of the rotary member 17, the retainer spring member 7 is mounted on the rotary member 17 by a concave and convex engagement means, furthermore, a holding portion for holding a condition that the ratchet teeth 5 and the retainer spring member 7 are engaged with each other and a condition that a disengagement between the ratchet teeth 5 and the retainer spring member 7 is released and the ratchet teeth 5 are formed of a harder member 13 than the body 2, and the harder member 13 is a discrete member from the body 2.

According to a second aspect of the invention, in the chuck device according to the first aspect, the ratchet teeth 5 are used which are made of a strip-like hard material 13 to be wrapped around a circumferential surface of the body 2.

According to a third aspect of the invention, in the chuck device according to the second aspect, a recess fixture portion 14 to which the strip-like hard member 13 is fixed is provided in the circumferential surface of the body 2.

According to a fourth aspect of the invention, in the chuck device according to the second aspect, the strip-like hard member 13 has both ends formed into perpendicular ends 13b to side edges thereof or slant ends 13a.

According to a fifth aspect of the invention, in the chuck device according to the third aspect, the strip-like hard member 13 has both ends formed into perpendicular ends 13b to side edges thereof or slant ends 13a.

According to a sixth aspect of the invention, in the chuck device according to the first aspect, the hard member 13 is made of the material selected from the group consisting of steel and stainless steel.

According to a seventh aspect of the invention, in the chuck device according to the first aspect, the body 2 is made of light material.

According to an eighth aspect of the invention, in the chuck device according to the seventh aspect, the light material is one selected from the group essentially consisting of non-iron material such as aluminum, magnesium and titanium, alloy thereof, synthetic resin or fiber reinforced resin.

Also, according to a ninth aspect of the invention, the chuck device according to the first aspect, the retainer spring member 7 is held in a predetermined position so that the holding portion may hold a condition that the ratchet teeth 5 and the retainer spring member 7 are engaged with each other and a condition that the engagement between the ratchet teeth 5 and the retainer spring member 7 is released.

Also, according to a tenth aspect of the invention, there is provided a chuck device in which a rotary sleeve 1 is rotated so that a plurality of jaws 3 inserted into a hole 2a provided in a body 2 is slidingly opened and closed to thereby clamp a tool 4 by the jaws 3, characterized in that ratchet teeth 5 forming an annular shape are provided in the body 2, an annular rotary member 17 threadedly engaged with the jaws 3 and rotated together with the rotary sleeve 1 is fitted around the body 2 inside of the rotary sleeve 1, a retainer spring member 30 and 31 detachably engaging with the ratchet teeth 5 is disposed outside of the ratchet teeth 5, the retainer spring member is composed of two spring members 30 and 31, one of the spring members 30 functions to perform the retaining effect with the ratchet teeth 5, the other retainer spring member 31 holds the position of the rotary sleeve 1 to thereby function to hold the position of the one retainer spring member 30, the retainer spring members 30 and 31 are provided to rotate around the ratchet teeth 5 according to the rotation of the rotary member 17, the retainer spring members 30 and 31 are mounted on the rotary member 17 by a concave and convex engagement means, a holding portion is provided for holding a condition that the ratchet teeth 5 and the one retainer spring member 30 are engaged with each other and a condition that the engagement between the ratchet teeth 5 and the one retainer spring member 30 is released, the holding portion is disposed between the body 2 and the rotary sleeve 1 and composed of the inner surface of the rotary sleeve 1 and the other retainer spring member 31, the body 2 is made of light material such as aluminum or aluminum alloy, and the ratchet teeth 5 forming the annular shape are made of a harder material than the body 2 and a discrete member from the body 2.

According to an eleventh aspect of the invention, in the chuck device according to the tenth aspect, the condition that the ratchet teeth 5 and one retainer spring member 30 are engaged with each other and the condition that the engagement between the ratchet teeth 5 and the one retainer spring member 30 is released are maintained by the concave and convex engagement of the other retainer spring member 31 and the rotary sleeve 1.

According to a twelfth aspect of the invention, the chuck device according to any one of the first to eleventh aspects, the ratchet teeth 5 have a coating layer which is hard and has a frictional coefficient as small as possible.

With such a structure according to the present invention, it is possible to provide a chuck device that prevents wear of ratchet teeth with a simple structure to make it possible to enhance durability and maintenance and that is extremely excellent in practical use.

BEST MODE FOR EMBODYING THE INVENTION

A possible best mode for embodying the invention will briefly be described with reference to the accompanying drawings with effects of the invention.

Since the ratchet teeth 5 are made of harder material than a body 2 made of light alloy such as aluminum or the like, even if the ratchet teeth 5 are continuously and repetitively engaged with a retainer spring member 7 made of, for example, steel, the wear of the ratchet teeth 5 is prevented as much as possible. Thus, ratchet teeth are excellent in durability and maintenance. Accordingly, it is possible to provide a chuck device that prevents wear of ratchet teeth with a simple structure to make it possible to enhance durability and maintenance and that is extremely excellent in practical use.

DESCRIPTION OF THE PREFERRED EMBODIMENTS

Embodiment 1

Figure 1:
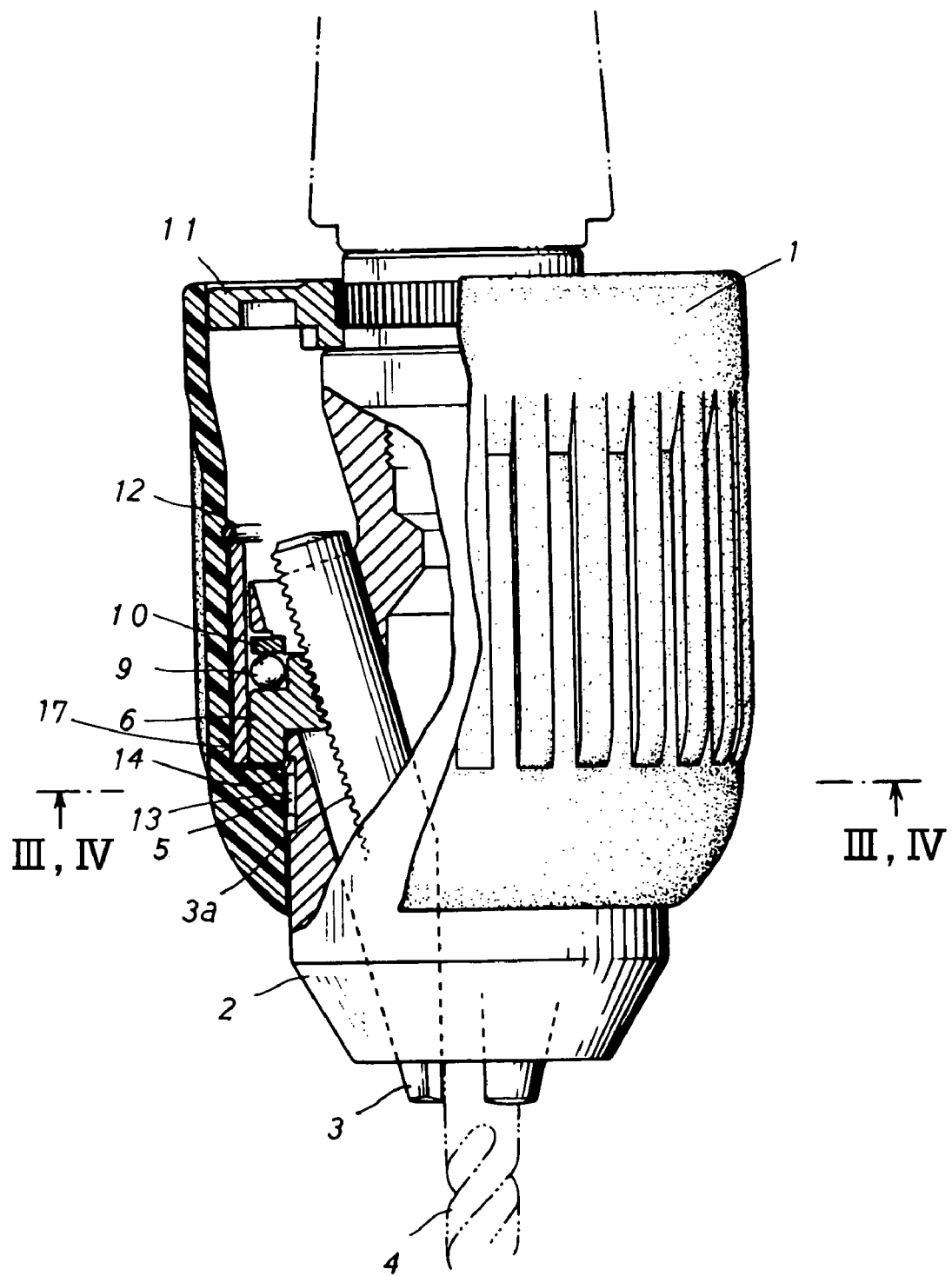
FIG. 1 is a fragmentary frontal view from which a part of a first embodiment has been removed.

A first embodiment of the invention will now be described with reference to the accompanying drawings.

FIGS. 1 to 4, 8(a) to 8(c) and 9 to 13 show the first embodiment applied to a chuck device to be used for a power rotary tool such as a so-called hummer drill, a vibration drill and a driver drill applying vibrations and shocks, which will now be described.

A body 2 is made of non-iron metal such as aluminum, magnesium and titanium, alloy thereof or light material such as synthetic resin or fiber reinforced resin. Incidentally, in the first embodiment, the body 2 is made of aluminum alloy.

Three jaws 3 are provided obliquely in a hole 2a formed in the body 2. An annular nut member 6 that is engaged with screw portions 3a formed on outer surfaces of the jaws 3 are provided in engagement with the jaws 3.

This nut member 6 is composed of divided nut segments and keeps its shape with a shape retaining ring 8.

Incidentally, in the embodiment, a rotary member 17 is rotated together with a rotary sleeve 1 and engaged with the jaws 3. In the first embodiment, the rotary member 17 is composed of the nut member 6 and the shape retaining ring 8. Accordingly, in the first embodiment, although the nut member 6 is coupled with the rotary sleeve 1 and the rotary sleeve 1 is rotated to rotate the nut member 6, it is possible to take, for example, a structure that the shape retaining ring 8 is coupled with the rotary sleeve 1 and the rotary sleeve 1 is rotated to rotate the shape retaining ring 8 and the nut member 6.

Four projecting portions 6a, 6b, 6c and 6d for mounting a retainer spring member 7 on the nut member 6 so as to rotate together are provided on the nut member 6. The projecting portions 6a, 6b, 6c and 6d are provided on the nut member 6 which is a necessary component. Since it is unnecessary to particularly provide a member in which the projecting portions 6a, 6b, 6c and 6d are provided, it is possible to simplify the structure for the first embodiment.

Ratchet teeth 5 forming an annular shape and engaging with a tip end retainer portion 7' of the retainer spring member 7 are formed on the body 2 in the forward side of the nut member 6.

The ratchet teeth 5 are formed of, for example, steel or stainless steel which is a harder member 13 than the body 2 and which is a discrete member from the body 2. Incidentally, the ratchet teeth 5 of the first embodiment are made of steel.

More specifically, the ratchet teeth 5 are made from a strip-like hard member 13 to be wrapped around a circumferential surface of the body 2. The hard member 13 is fixed to a recess fixture portion 14 for making possible to fix the strip-like hard member 13 provided around the circumferential surface of the body 2.

Incidentally, in the first embodiment, the strip-like hard member 13 is used and wrapped around the circumferential surface of the body 2 to form the ratchet teeth 5. However, it is possible to form the ratchet teeth 5 by using another means such as pressingly inserting an annular member, formed in advance in an annular shape, around the circumferential surface of the body 2.

Figure 9:
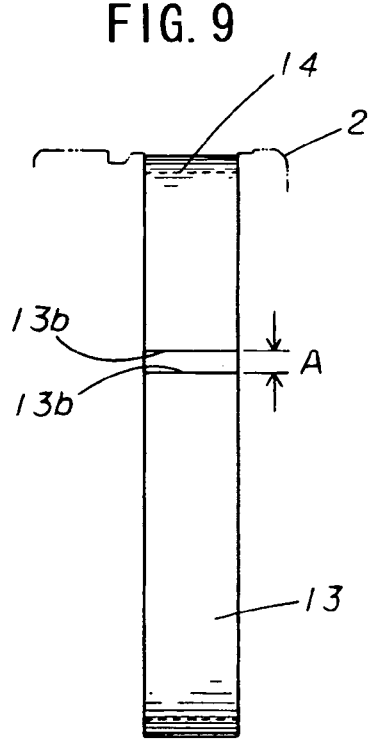
FIG. 9 is a schematic illustrative view showing an end shape of a hard member of the first embodiment.

In the first embodiment, the ratchet teeth 5 are formed as follows. The strip-like hard member 13 having both ends formed into perpendicular edges 13b to side edges thereof as shown in FIG. 9 is wrapped around the above-described recess fixture portion 14 (see FIG. 8(a)). This recess fixture portion 14 is plastically deformed by a suitable tool 15 to thereby fix the strip-like hard member 13 in place (see FIG. 8(b)). A suitable concave and convex shape is applied to the strip-like hard member 13 fixed to the recess fixture portion 14 by a tool 16 for forming the ratchet teeth 5 (see FIG. 8(c)).

Accordingly, as a matter of course, it is possible to form to the light body 2 the ratchet teeth 5 that is excellent in hardness and that is hard to be worn due to the engagement with the retainer spring member 7 in the easy method. In addition, since both ends of the hard member 13 are formed into the perpendicular edges 13b to the side edges as shown in FIG. 9, it is possible to positively fix the entire circumferential portion of the hard member 13 to the recess fixture portion 14 by utilizing the elongation when the concave and convex shape is applied to the strip-like hard member 13 by machining the hard member 13 with the tool 16 for forming the ratchet teeth 5. It is therefore possible to prevent the end portions of the strip-like hard member 13 from peeling off. In this case, in particular, when the hard member 13 is wrapped around the circumferential surface of the body 2, it is preferable that an interval of both ends thereof (indicated by A in FIG. 9) be set to be not greater than a length of one tooth of the ratchet teeth 5.

Figure 10:
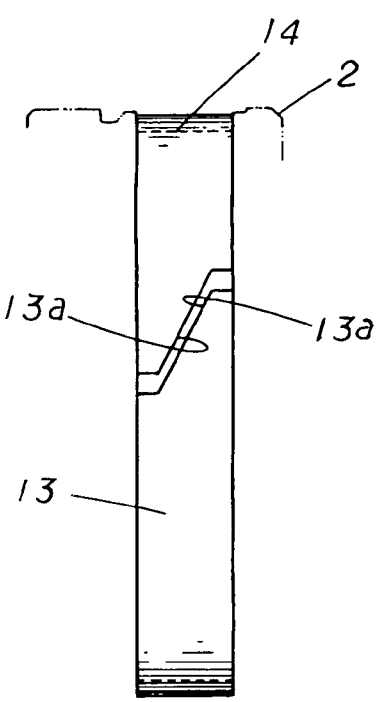
FIG. 10 is a schematic illustrative view showing an end shape of a hard member of another example.
Figure 11:
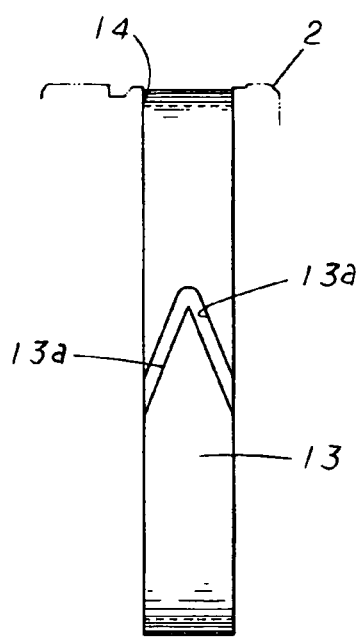
FIG. 11 is a schematic illustrative view showing an end shape of a hard member of still another example.

Incidentally, it is possible to use a strip-like hard member 13 whose both ends are formed into slant ends 13a which may be kept in engagement with each other as shown in FIGS. 10 and 11. In this case, it is possible to continuously form the teeth along the entire circumference without any gap by machining the hard member 13 with the tool 16 for forming the ratchet teeth 5. Consequently, the engagement with the retainer spring member 7 may be performed well. (In any place, a tooth is formed.)

Figure 12:
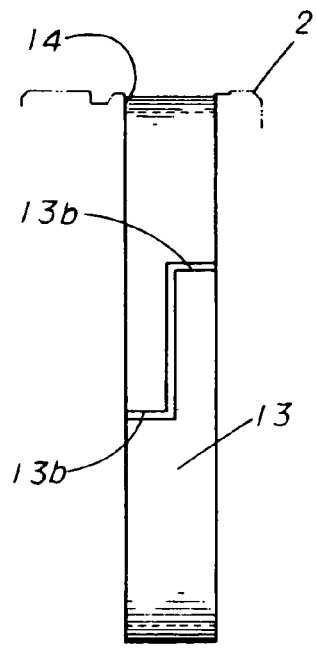
FIG. 12 is a schematic illustrative view showing an end shape of a hard member of still another example.
Figure 13:
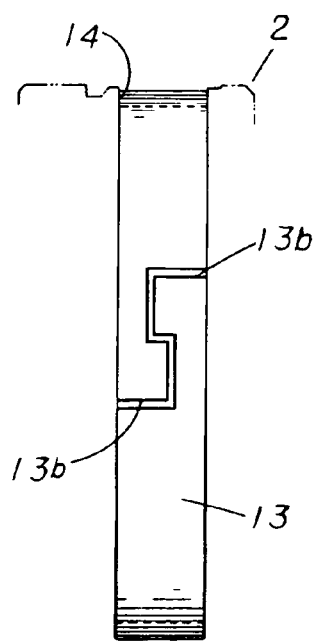
FIG. 13 is a schematic illustrative view showing an end shape of a hard member of still another example.

Also, FIGS. 12 and 13 show other examples where both ends of the hard member 13 are formed into perpendicular ends 13b to the side edges in engagement with each other.

The engagement between the ratchet teeth 5 and the above-described tip end retainer portion 7' makes it possible to exhibit the condition that the nut 6 may be rotated one way only (not capable of rotating in a reverse direction). Incidentally, the tip end retainer portion 7' is adapted to come into contact with the strip-like hard member 13 forming the ratchet teeth 5 in a predetermined range (indicated by B in FIG. 8(c)).

Reference numeral 9 designates steel balls. Reference numeral 10 denotes a steel ball receiver. Since this steel ball receiver 10 has a resiliency, it is possible to prevent the rotary sleeve 1 from rotating more than necessary in a fastening direction due to the vibration or the shock torque of the power rotary tool.

The retainer spring member 7 is made of metal (iron or steel) and is arranged to be supported to the inner surface of the rotary sleeve 1 around the ratchet teeth 5. Reference characters 1b and 1e denote projecting portions for transmitting the rotational force of the rotary sleeve 1 to the nut member 6. Incidentally, if the rotational force of the rotary sleeve 1 is transmitted through the shape retaining ring 8, it is possible to transmit the rotational force in the same manner.

Figure 2:
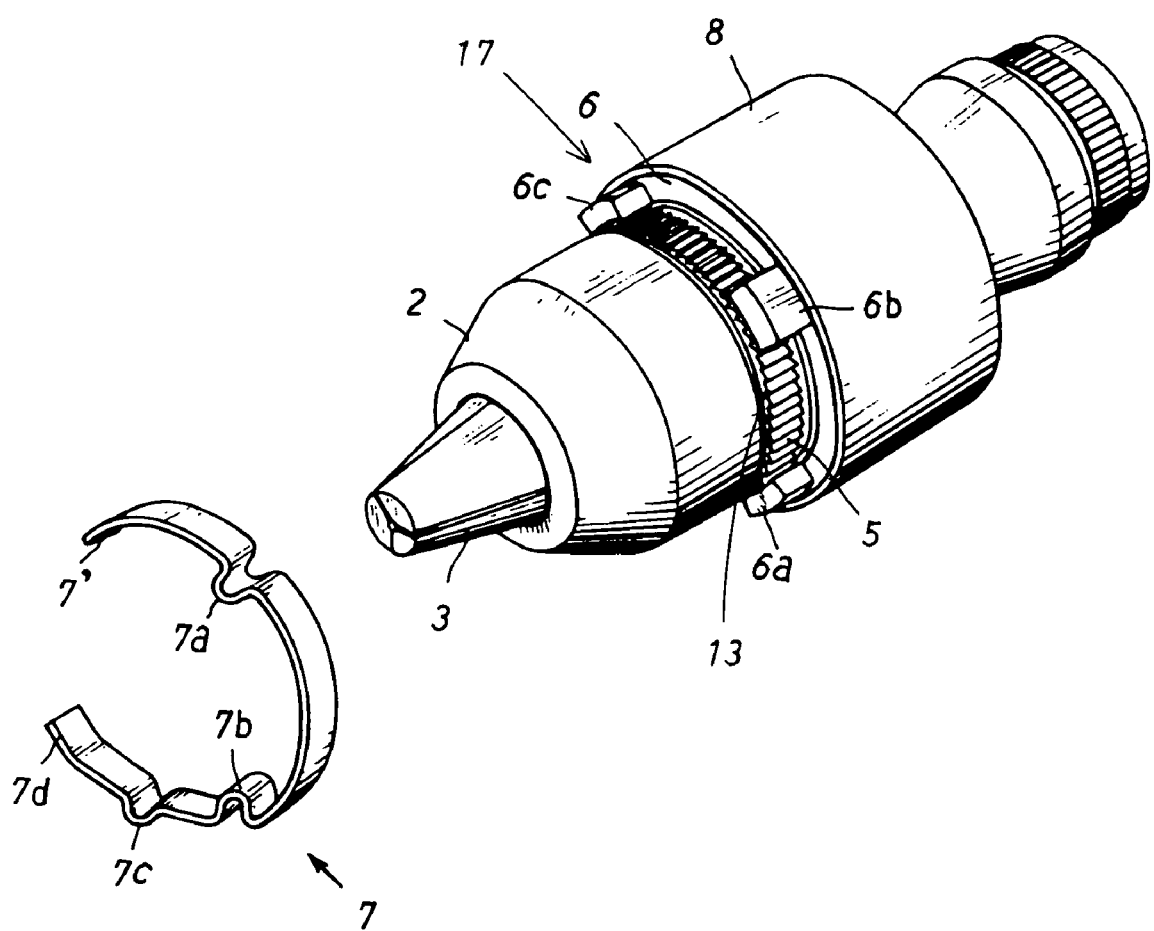
FIG. 2 is an exploded perspective view of the first embodiment.
Figure 3:
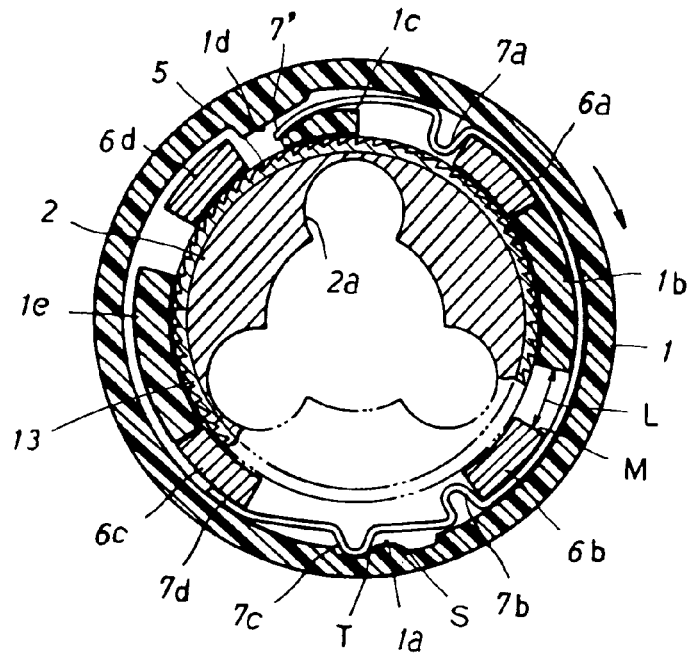
FIG. 3 is a cross-sectional view taken along the line III-III of FIG. 1 which shows the operation of the first embodiment.
Figure 4:
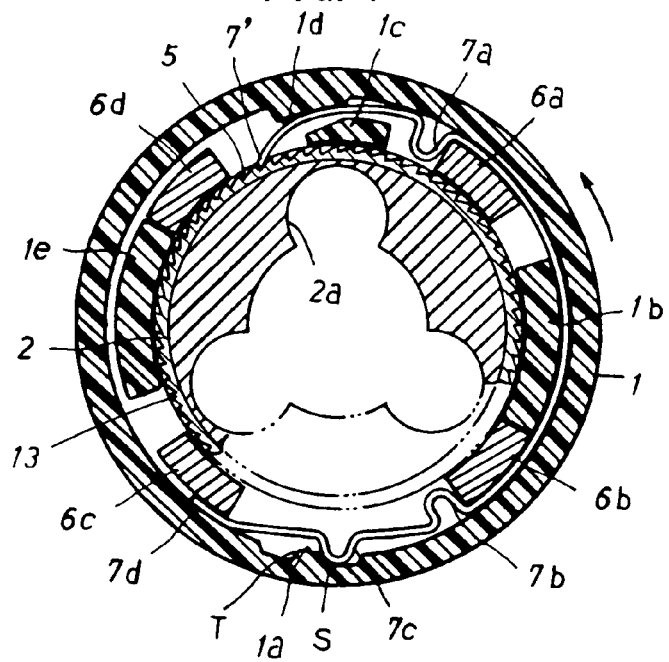
FIG. 4 is a cross-sectional view taken along the line IV-IV of FIG. 1 which shows the operation of the first embodiment.

As shown in FIGS. 2, 3 and 4, three projecting portions 7a, 7b and 7c and the tip end retainer portion 7' to be engaged with the ratchet teeth 5 are provided on the retainer spring member 7. A contact portion 7d in contact with the projecting portion 6c for well exhibiting a spring force is provided at the rear end. The opposite side of the contact portion 7d is received by the projecting portion 6b. The retainer spring member 7 is provided to rotate together with the nut member 6 by the projecting portions 6a and 6b of the nut member 6 and the projecting portions 7a and 7b of the retainer spring member 7.

In the first embodiment, since the retainer spring member 7, the projecting portions 1b and 1e and the projecting portions 6a, 6b, 6c and 6d are arranged substantially on the same circumference, it is possible to perform a compact design.

Incidentally, the mounting manner of the retainer spring member 7 and the nut member 6 is not limited to the above-described structure as far as both components are rotated together. Also, in the first embodiment, although the retainer spring member 7 is mounted on the nut member 6 by the concave and convex engagement means, it is possible to take a structure where the retainer spring member 7 is mounted on the shape retaining ring 8 by the concave and convex engagement means.

An intervening member 1c is provided on the inner surface of the rotary sleeve 1 for positively performing the disengagement between the tip end retainer portion 7' of the retainer spring member 7 and the ratchet teeth 5. The tip end retainer portion 7' is received by a tip end tapered surface of the intervening member 1c so that the release of the engagement (threaded engagement) between the tip end retainer portion 7' and the ratchet teeth 5 may positively be performed.

A depressing portion 1d for depressing the tip end retainer portion 7' of the retainer spring member 7 and maintaining the engagement condition between the tip end retainer portion 7' and the ratchet teeth 5 is formed on the inner surface of the rotary sleeve 1.

The rotary sleeve 1 whose tip end is received to the body 2 is fitted around the nut member 6. The rotary sleeve 1 is rotated together with the nut member 6. However, when a predetermined load is applied to the rotation of the nut member 6, the rotary sleeve 1 is adapted to rotate through a predetermined angle relative to the nut member 6.

The rotation of the rotary sleeve 1 through the predetermined angle relative to the nut member 6 is defined between the projecting portion 6a and the projecting portion 6b and more specifically indicated by L in FIG. 3. Accordingly, when the rotary sleeve 1 rotates and the load is applied, the projecting portion 1a of the rotary sleeve 1 rides over the projecting portion 7c against the spring force of the retainer spring member 7 and the end face of the projecting portion 1b comes into contact with an end face M of the projecting portion 6b. (In the same manner, the end face of the projecting portion 1e comes into contact with the end face of the projecting portion 6d.) Then, the rotary sleeve 1 and the nut member 6 become together to increase the fastening.

There is no fear that the rotary sleeve 1 is rotated in the loosening direction so far as the projecting portion 1a does not ride over the projecting portion 7c of the retainer spring member 7 against the spring force of the retainer spring member 7 due to the existence of the projecting portion 1a. Accordingly, to such an extent, it is possible to positively exhibit the looseness preventing effect. Incidentally, it is possible to set the looseness preventing force according to the spring force of the retainer spring member 7, particularly the spring force between the projecting portion 7b and the contact portion 7d and the shape of the projecting portion 1a and the projecting portion 7c.

Furthermore, slippage-preventing convex portions are formed on the outer surface of the rotary sleeve 1 (made of synthetic resin). Also, the rotary sleeve 1 is received by the receiving member 11 having a tip end to the body 2 and a rear end to the body 2.

Figure 14:
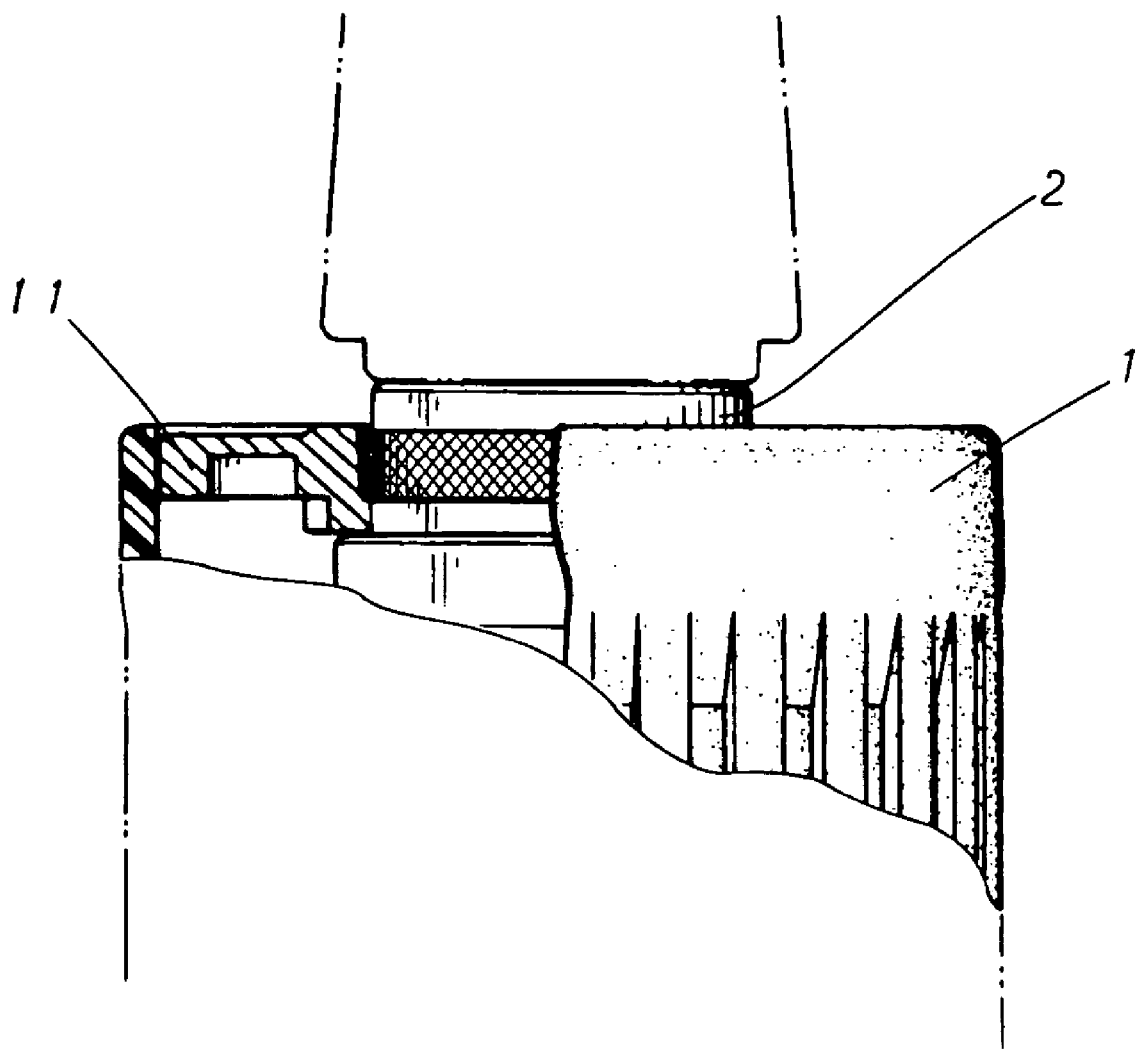
FIG. 14 is a frontal view from which a part has been removed as another example.

Incidentally, in the case where the power rotary tool such as a driver drill or the like is used, the rotary force is required for the machining work such as opening and closing the chucks or boring. However, in the case where the power rotary tool such as an impact driver, a hammer drill or a vibration drill or the like is used, since the holding force in the axial direction for preventing the pull-off is needed although the rotational force is necessary, it is preferable to use the coupling with a cross-knurled shape provided at the rear end of the body 2 for the coupling between the receiving member 11 and the body 2 (see FIG. 14). Also, in some case, the receiving member 11 is received within the rotary sleeve 1 and in another case, the receiving member 11 is exposed outside of the rotary sleeve 1.

Reference numeral 12 denotes a C-shaped pull-off preventing ring of the rotary sleeve 1.

With such a structure in the first embodiment, the following effects are ensured.

When the rotary sleeve 1 is rotated while the tool 4 is being clamped by the jaws 3, the rotary sleeve 1 and the nut member 6 are rotated together until the predetermined load is applied to the rotary sleeve 1. Accordingly, also the retainer spring member 7 is rotated around the ratchet teeth 5.

When the rotary sleeve 1 is rotated up to the predetermined position (where the jaws 3 are brought into contact with the tool 4), the predetermined load is applied to the rotary sleeve 1 (under the condition shown in FIG. 3). When the rotary sleeve 1 is further rotated from this condition against the spring force in the direction indicated by the arrow in FIG. 3, the rotary sleeve 1 is rotated relative to the nut member 6. The intervening member 1c for receiving the tip end retainer portion 7' of the retainer spring member 7 is moved. At the same time, the depressing portion 1d of the rotary sleeve 1 depresses the tip end retainer portion 7' so that the tip end retainer portion 7' retains the ratchet teeth 5. Furthermore, the projecting portion 1a of the rotary sleeve 1 rides over the projecting portion 7c of the retainer spring member 7. (The projecting portion 7c is positioned from a T-side to an S-side in FIG. 3.) The projecting portion 1b is brought into contact with the end face M of the projecting portion 6b and in the same manner, the projecting portion 1e is brought into contact with the projecting portion 6d to form the rotary sleeve 1 and the nut member 6 together. Furthermore, when the rotary sleeve 1 is rotated, the tip end retainer portion 7' of the retainer spring member 7 retained at the ratchet teeth 5 rides over the ratchet teeth 5 one by one by the leaf spring effect. (In this condition, no reverse rotation is generated due to the ratchet teeth 5.) The rotational resistance of the rotary sleeve 1 is increased to complete the fastening operation (see FIG. 4).

Incidentally, under the condition that the retainer spring member 7 rides over the ratchet teeth one by one, the fastening operation is not completed. If the fastening operation is completed, the ride-over of the teeth is not generated.

This fastened condition is kept by the projecting portion 7c and the projecting portion 1a.

Also, in order to release the fastened condition, the steps are performed in the opposite order to that of the above-described steps. When the rotary sleeve 1 is rotated in the reverse direction, the projecting portion 7c located on the S-side (condition shown in FIG. 4) rides over the projecting portion 1a. When the rotary sleeve 1 is further rotated in the direction indicated by the arrow in FIG. 4, the engagement (threaded engagement) between the tip end retainer portion 7' and the ratchet teeth 5 by the depressing portion 1d is released. Furthermore, the intervening member 1c is moved to raise the tip end retainer portion 7' of the retainer spring member 7. The rotary sleeve 1 is further rotated to loosen the fastened condition of the tool 4. This condition, i.e., the condition that the engagement between the tip end retainer portion 7' of the retainer spring member 7 and the ratchet teeth 5 is released is retained by the projecting portion 7c and the projecting portion 1a.

According to the first embodiment, it is possible to provide a chuck device that is excellent in durability with a simple structure and in which the looseness of the fastening operation of the tool 4 is positively prevented.

Also, since the body 2 is made of light material, the chuck device according to the first embodiment is excellent in practical use and in addition ratchet teeth 5 is made of harder material than the body 2 made of light material, the device is more excellent and it is possible to more effectively prevent the wear caused by the engagement with the retainer spring member 7. The device is excellent in durability and maintenance.

The intervening member 1c according to the first embodiment is used so that the tip end retainer portion 7' of the retainer spring member 7 is not accidentally engaged with the ratchet teeth 5. (Accordingly, under the condition, i.e., the condition that the depressing portion 1d is not brought into contact with the tip end retainer portion 7', the tip end retainer portion 7' is separated away from the ratchet teeth 5 by the resiliency of the spring.) By dispensing with the depressing portion 1d or not using the depressing portion 1d, it is possible to threadedly engage the tip end retainer portion 7' with the ratchet teeth 5 and to forcibly disengage the rip end retainer portion 7' from the ratchet teeth 5 by the intervening member 1c.

Also, it is possible to apply a coating layer that is hard and having a small friction coefficient as much as possible. In this case, even if chips are brought into collision with the body 2, the body 2 is hardly damaged. Furthermore, since the coating layer is applied also to the ratchet teeth 5, the wear of the ratchet teeth 5 is further prevented. At the same time, the engagement with and disengagement from the retainer spring member 7 is smoothly performed. The above-described coating layer is also applied to the inner surface of the hole 2a of the body 2. Accordingly, the sliding movement of the jaws 3 is smoothly performed. Accordingly, it is possible to perform the hold of the tool 4 in a good manner. In particular, the vibration is applied intermittently in the axial direction or the rotational direction to a so-called hammer drill, a vibration drill, a driver drill or the like for applying the vibration or shock. A sticking is generated in the inner surfaces of the jaws 3 and the hole 2a during vibration and in some case, the sliding opening and closing operation of the jaws 3 is not well performed. Such a problem may be solved.

Incidentally, it is preferable to use as the coating layer such as "hard almite", "Tahuramu" (Toughgram) Trade Mark made by Mitsubishi Material Company, or "RUBUNIKKU" (Lubnick) (Trade Mark made by Mitsubishi Material Company. Also, it is preferable that the thickness of the coating layer be in the range of 2 μm to 60 μm. Also, if the coating layer is applied also to the nut member 6 and the jaws 3, the rotation of the nut member 6 is smoothly performed.

Embodiment 2

Figure 5:
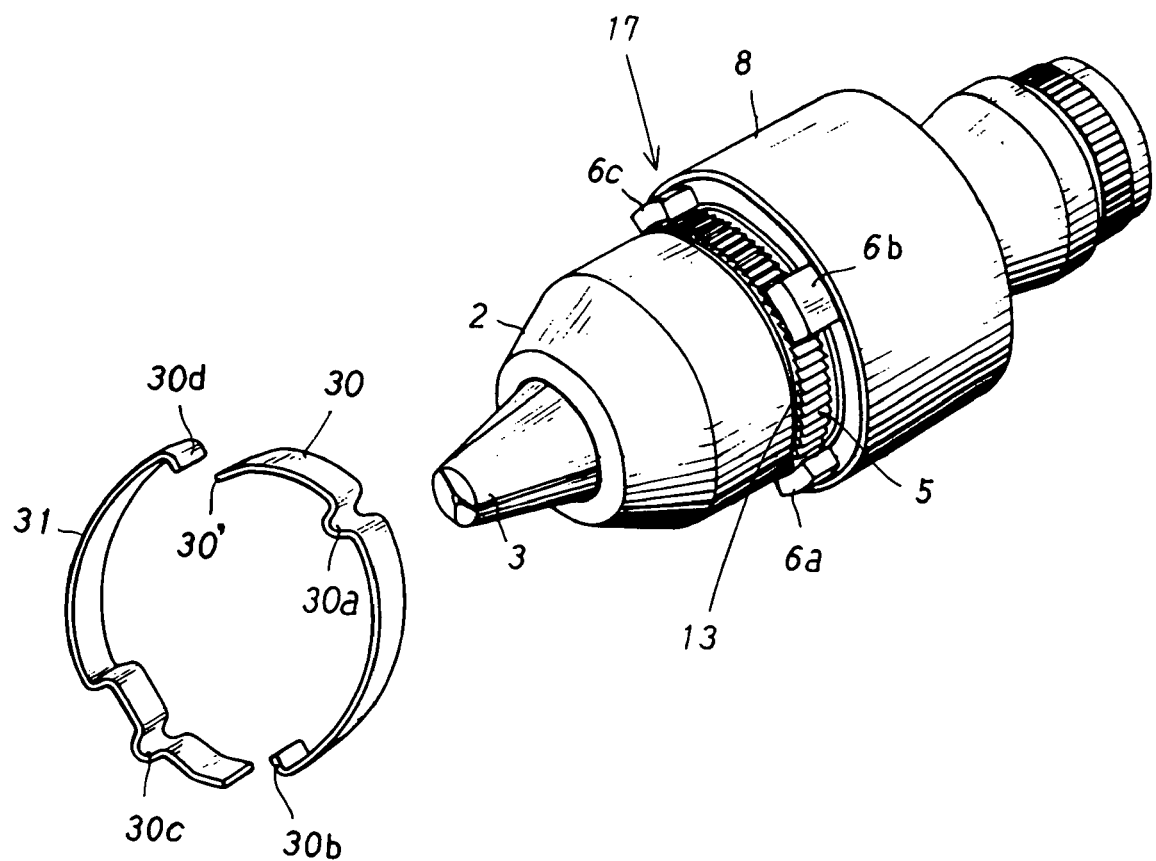
FIG. 5 is an exploded perspective view of a second embodiment.
Figure 6:
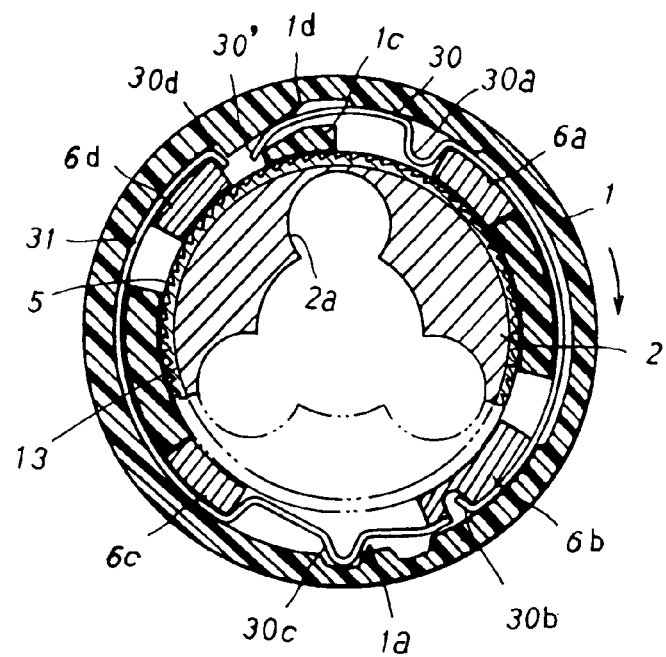
FIG. 6 is a cross-sectional view of the second embodiment corresponding to FIG. 3.
Figure 7:
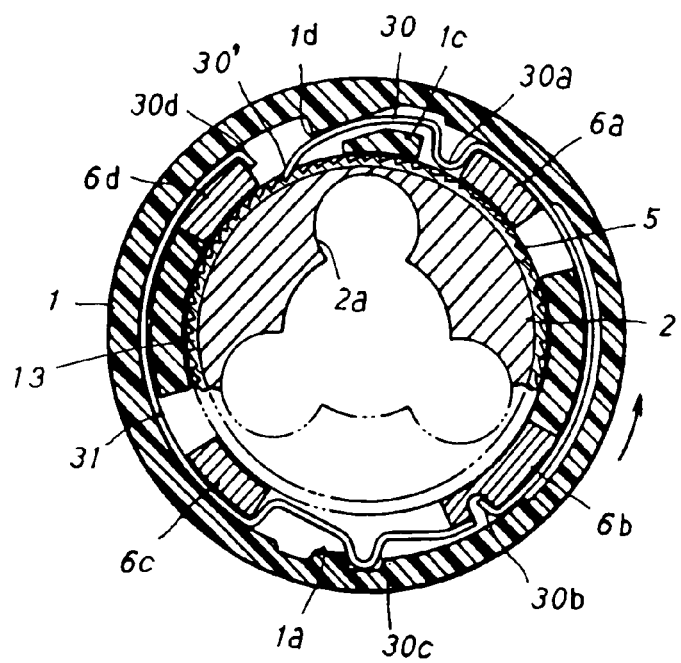
FIG. 7 is a cross-sectional view of the second embodiment corresponding to FIG. 4.
Figure 8A:
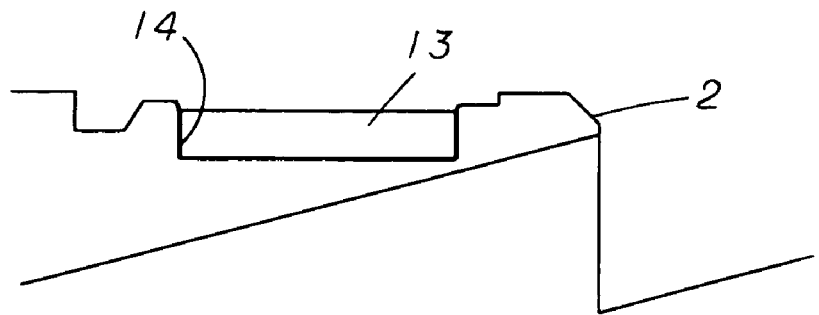
FIGS. 8(a), 8(b) and 8(c) are schematic illustrative cross-sectional views showing manufacturing processes of the ratchet teeth.
Figure 8B:
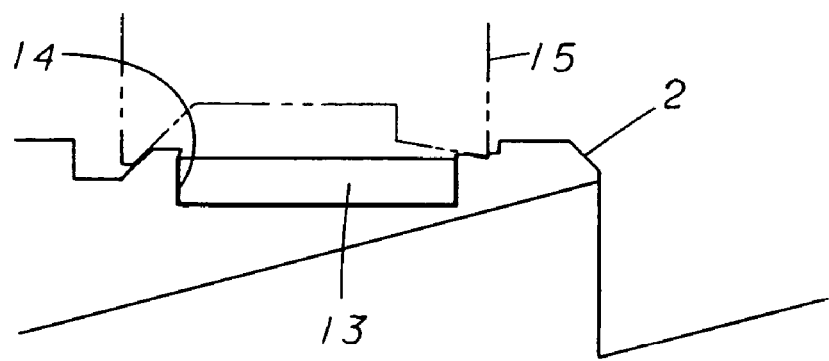
Figure 8C:
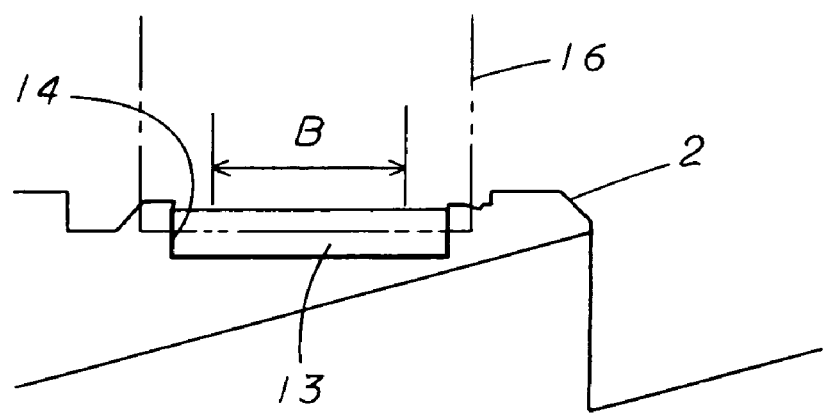

FIGS. 5 to 7 show a second embodiment of the invention, which will now be described.

In the second embodiment, the retainer spring member 7 of the first embodiment is composed of two retainer spring members 30 and 31. A first retainer spring member 30 functions to retain with the ratchet teeth 5. Also, the other retainer spring member 31 functions to hold the position of the rotary sleeve 1 to hold the first retainer spring 30 in a predetermined position. In the second embodiment, the retaining effect with the ratchet teeth 5 and the retaining condition holding effect and the retaining releasing condition holding effect with the ratchet teeth 5 are assigned to different springs, respectively, unlike the first embodiment.

Thus, in the second embodiment, since the retaining effect with the ratchet teeth 5 and the retaining condition holding effect and the retaining releasing condition holding effect with the ratchet teeth 5 are assigned to different springs, respectively, it is possible to suitably set the thickness of the other retaining spring member 31 to make it possible to select the retaining holding force. To such an extent, it is possible to easily set the retaining holding force as desired. The other structure is the same as that of the first embodiment.

Reference character 30' denotes a portion corresponding to the tip end retainer portion 7' of the first embodiment. Reference character 30a designates a portion corresponding to the projecting portion 7a of the first embodiment. Reference character 30b denotes a retaining portion corresponding to the projecting portion 7b of the first embodiment. Reference character 30c denotes a portion corresponding to the projecting portion 7c of the first embodiment. Reference character 30d denotes a retaining portion with the projecting portion 7d.

What is claimed is:

1. A chuck device in which a rotary sleeve is rotated so that a plurality of jaws inserted into a hole provided in a tip end of a body is slidingly opened and closed to thereby clamp a tool by the jaws, characterized in that ratchet teeth forming an annular shape are provided in the body, an annular rotary member threadedly engaged with the jaws and rotated together with the rotary sleeve is fitted around the body inside of the rotary sleeve, a retainer spring member detachably engaging with the ratchet teeth is disposed outside of the ratchet teeth, the retainer spring member is provided so as to rotate a circumference of the ratchet teeth in accordance with the rotation of the rotary member, the retainer spring member is mounted on the rotary member by a concave and convex engagement means, furthermore, a holding portion for holding a condition that the ratchet teeth and the retainer spring member are engaged with each other and a condition that a disengagement between the ratchet teeth and the retainer spring member is released and the ratchet teeth are formed of a harder member than the body, and having a strip shape to be wrapped around the circumferential surface of the body, said harder member is a discrete member from the body.

2. The chuck device according to claim 1, wherein a recess fixture portion to which the strip-like hard member is fixed is provided in the circumferential surface of the body.

3. The chuck device according to claim 2, wherein the strip-like hard member has both ends formed into perpendicular ends to side edges thereof or slant ends.

4. The chuck device according to claim 1, wherein the strip-like hard member has both ends formed into perpendicular ends to side edges thereof or slant ends.

5. The chuck device according to claim 1, wherein the hard member is made of the material selected from the group consisting of steel and stainless steel.

6. The chuck device according to claim 1, wherein the body is made of light material.

7. The chuck device according to claim 6, wherein the light material is one selected from the group essentially consisting of aluminum, magnesium and titanium, synthetic resin or fiber reinforced resin.

8. The chuck device according to claim 1, wherein the retainer spring member is held in a predetermined position so that the holding portion may hold a condition that the ratchet teeth and the retainer spring member are engaged with each other and a condition that the engagement between the ratchet teeth and the retainer spring member is released.

9. The chuck device according to claim 1, wherein the ratchet teeth have a coating layer which is hard and has a frictional coefficient as small as possible.

10. A chuck device in which a rotary sleeve is rotated so that a plurality of jaws inserted into a hole provided in a body is slidingly opened and closed to thereby clamp a tool by the jaws, characterized in that ratchet teeth forming an annular shape are provided in the body, an annular rotary member threadedly engaged with the jaws and rotated together with the rotary sleeve is fitted around the body inside of the rotary sleeve, a retainer spring member detachably engaging with the ratchet teeth is disposed outside of the ratchet teeth, the retainer spring member is composed of two spring members, one of the spring members functions to perform the retaining effect with the ratchet teeth, the other retainer spring member holds the position of the rotary sleeve to thereby function to hold the position of the one retainer spring member, the retainer spring members are provided to rotate around the ratchet teeth according to the rotation of the rotary member, the retainer spring members are mounted on the rotary member by a concave and convex engagement means, a holding portion is provided for holding a condition that the ratchet teeth and the one retainer spring member are engaged with each other and a condition that the engagement between the ratchet teeth and the one retainer spring member is released, the holding portion is disposed between the body and the rotary sleeve and composed of the inner surface of the rotary sleeve and the other retainer spring member, the body is made of light material such as aluminum or aluminum alloy, and the ratchet teeth forming the annular shape are made of a harder material than the body and a discrete member from the body.

11. The chuck device according to claim 10, wherein the condition that the ratchet teeth and one retainer spring member are engaged with each other and the condition that the engagement between the ratchet teeth and the one retainer spring member is released are maintained by the concave and convex engagement of the other retainer spring member and the rotary sleeve.

12. The chuck device according to claim 10, wherein the ratchet teeth have a coating layer which is hard and has a frictional coefficient as small as possible.

13. A chuck device in which a rotary sleeve is rotated so that a plurality of jaws inserted into a hole provided in a tip end of a body is slidingly opened and closed to thereby clamp a tool by the jaws, characterized in that ratchet teeth forming an annular shape are provided in the body, an annular rotary member threadedly engaged with the jaws and rotated together with the rotary sleeve is fitted around the body inside of the rotary sleeve, a retainer spring member detachably engaging with the ratchet teeth is disposed outside of the ratchet teeth, the retainer spring member is provided so as to rotate a circumference of the ratchet teeth in accordance with the rotation of the rotary member, the retainer spring member is mounted on the rotary member by a concave and convex engagement means, furthermore, a holding portion for holding a condition that the ratchet teeth and the retainer spring member are engaged with each other and a condition that a disengagement between the ratchet teeth and the retainer spring member is released and the ratchet teeth are formed of a harder member than the body and configured in an annular member pressingly to be inserted in the body, said harder member is a discrete member from the body.

14. The chuck device according to claim 13, wherein the hard member is made of the material selected from the group consisting of steel and stainless steel.

15. The chuck device according to claim 13, wherein the body is made of light material.

16. The chuck device according to claim 15, wherein the light material is one selected from the group essentially consisting of aluminum, magnesium and titanium, synthetic resin and fiber reinforced resin.

17. The chuck device according to claim 13, wherein the retainer spring member is held in a predetermined position so that the holding portion may hold a condition that the ratchet teeth and the retainer spring member are engaged with each other and a condition that the engagement between the ratchet teeth and the retainer spring member is released.

18. The chuck device according to claim 13, wherein the ratchet teeth have a coating layer which is hard and has a frictional coefficient as small as possible.

* * * * *

UNITED STATES PATENT AND TRADEMARK OFFICE
CERTIFICATE OF CORRECTION

| | | |
|---|---|---|
| PATENT NO. | : 7,497,444 B2 | Page 1 of 1 |
| APPLICATION NO. | : 11/105506 | |
| DATED | : March 3, 2009 | |
| INVENTOR(S) | : Kazuo Sakamaki, Akira Sakamaki and Tadashi Taniguchi | |

It is certified that error appears in the above-identified patent and that said Letters Patent is hereby corrected as shown below:

Column 10, line 47, delete "light material such as"

Column 10, line 49, insert --the ratchet teeth are-- between "and" and "a"

Signed and Sealed this

Twenty-fifth Day of August, 2009

David J. Kappos
*Director of the United States Patent and Trademark Office*